(12) United States Patent
Igari et al.

(10) Patent No.: US 10,907,002 B2
(45) Date of Patent: Feb. 2, 2021

(54) COPOLYMER LATEX

(71) Applicant: ZEON CORPORATION, Tokyo (JP)

(72) Inventors: Naohiro Igari, Chiyoda-ku (JP); Shinji Kato, Chiyoda-ku (JP)

(73) Assignee: ZEON CORPORATION, Tokyo (JP)

( * ) Notice: Subject to any disclaimer, the term of this patent is extended or adjusted under 35 U.S.C. 154(b) by 169 days.

(21) Appl. No.: 16/083,704

(22) PCT Filed: Mar. 24, 2017

(86) PCT No.: PCT/JP2017/012146
§ 371 (c)(1),
(2) Date: Sep. 10, 2018

(87) PCT Pub. No.: WO2017/170267
PCT Pub. Date: Oct. 5, 2017

(65) Prior Publication Data
US 2019/0071530 A1    Mar. 7, 2019

(30) Foreign Application Priority Data
Mar. 30, 2016  (JP) .................................. 2016-068284

(51) Int. Cl.
| | | |
|---|---|---|
| C08F 236/12 | (2006.01) | |
| B29C 41/00 | (2006.01) | |
| B29C 41/14 | (2006.01) | |
| B29C 41/20 | (2006.01) | |
| C08F 220/04 | (2006.01) | |
| B32B 27/30 | (2006.01) | |
| B32B 27/00 | (2006.01) | |
| C08F 220/42 | (2006.01) | |
| B32B 27/12 | (2006.01) | |
| C08F 236/04 | (2006.01) | |
| B29K 105/00 | (2006.01) | |
| B29L 31/48 | (2006.01) | |

(52) U.S. Cl.
CPC .......... *C08F 236/12* (2013.01); *B29C 41/003* (2013.01); *B29C 41/14* (2013.01); *B29C 41/20* (2013.01); *B32B 27/00* (2013.01); *B32B 27/12* (2013.01); *B32B 27/30* (2013.01); *C08F 220/04* (2013.01); *C08F 220/42* (2013.01); *C08F 236/04* (2013.01); *B29K 2105/0064* (2013.01); *B29L 2031/4864* (2013.01); *C08F 2800/20* (2013.01); *C08F 2810/20* (2013.01)

(58) Field of Classification Search
CPC ............................................ B29K 2015/0064
See application file for complete search history.

(56) References Cited

U.S. PATENT DOCUMENTS

| | | |
|---|---|---|
| 5,369,166 A | 11/1994 | Ozawa et al. |
| 6,844,385 B1 | 1/2005 | Hagiwara et al. |
| 2002/0111431 A1 | 8/2002 | Kajiwara et al. |
| 2003/0050377 A1* | 3/2003 | Hagiwara ................ C08K 3/22 524/418 |
| 2005/0154122 A1 | 7/2005 | Ota et al. |
| 2005/0171272 A1 | 8/2005 | Ota et al. |
| 2006/0235158 A1† | 10/2006 | Ota |
| 2008/0051498 A1 | 2/2008 | Kodama |
| 2011/0265246 A1* | 11/2011 | Saito ................ A41D 19/01558 2/168 |
| 2014/0302265 A1 | 10/2014 | Yang et al. |
| 2015/0232637 A1 | 8/2015 | Cha et al. |
| 2016/0244575 A1 | 8/2016 | Kim et al. |

FOREIGN PATENT DOCUMENTS

| | | |
|---|---|---|
| JP | 2002-241412 A | 8/2002 |
| JP | 2003-268050 A | 9/2003 |
| JP | 2007-177091 A | 7/2007 |
| JP | 2007177091 A2 † | 7/2007 |
| JP | 4404053 B2 | 1/2010 |
| JP | 2011-132355 A | 7/2011 |
| JP | 2012-201856 A | 10/2012 |
| JP | 2013-203914 A | 10/2013 |
| JP | 2014-088643 A | 5/2014 |
| JP | 2014-530289 A | 11/2014 |
| JP | 2015-063635 A | 4/2015 |
| JP | 2016-508534 A | 3/2016 |
| WO | 01/053388 A1 | 7/2001 |
| WO | 2015/030533 A1 | 3/2015 |

OTHER PUBLICATIONS

Jul. 31, 2019 Third Party Observations issued in European Patent Application No. 17774804.3.
May 16, 2017 International Search Report issued in International Patent Application PCT/JP2017/012146.
Nov. 11, 2019 Extended Search Report issued in European Patent Application No. 17774804.3.
Oct. 2, 2018 International Preliminary Report on Patentability issued in International Patent Application PCT/JP2017/012146.

* cited by examiner
† cited by third party

*Primary Examiner* — Ian A Rummel
(74) *Attorney, Agent, or Firm* — Oliff PLC

(57) ABSTRACT

A copolymer latex of a copolymer comprising 50 to 88 wt % of a conjugated diene monomer unit, 10 to 40 wt % of an ethylenically unsaturated nitrile monomer unit, and 2 to 10 wt % of an ethylenically unsaturated acid monomer unit, the copolymer latex having an insoluble content in methyl ethyl ketone of 70 wt % or less and a swelling degree in methyl ethyl ketone of 40 times or more when the copolymer is formed into a dry film.

6 Claims, No Drawings

COPOLYMER LATEX

TECHNICAL FIELD

The present invention relates to a copolymer latex, further specifically, to a copolymer latex capable of effectively suppressing the occurrence of cracks in a rubber layer famed thereof in a laminate including a fiber substrate and the rubber layer formed thereon.

BACKGROUND ART

Conventionally, protective gloves famed by coating textile gloves with rubber, resin, or the like have been used as work gloves in various applications such as manufacturing work in factories, easy work, construction work, and agricultural work. Such work gloves are required to be excellent, for example, in waterproof properties, chemical resistance, workability, and the like. Further, such work gloves are required to have no cracks on the coating famed of rubber, resin, or the like, for sufficient waterproof properties or chemical resistance.

For example, Patent Document 1 discloses a work glove having excellent permeation resistance against sulfuric acid, the work glove being obtained by coating a textile glove with a plurality of layers. In the technique of Patent Document 1, cracks are prevented by forming the plurality of coating layers. However, there is a problem in the technique of Patent Document 1 that the production process is complicated to result in poor productivity since the plurality of coating layers are famed.

RELATED ART

Patent Document

Patent Document 1: Japanese Patent Laid-Open No. 2014-88643

SUMMARY OF THE INVENTION

Problem to be Solved by the Invention

It is an object of the present invention to provide a copolymer latex capable of effectively suppressing the occurrence of cracks in a rubber layer famed thereof in a laminate including a fiber substrate and the rubber layer famed thereon. Further, it is another object of the present invention to provide a laminate obtained by using the copolymer latex.

Means for Solving the Problem

As a result of dedicated research in order to solve the aforementioned problem, the inventors have found that the aforementioned objects can be achieved by a copolymer latex that is a latex of a copolymer containing a conjugated diene monomer unit, an ethylenically unsaturated nitrile monomer unit, and an ethylenically unsaturated acid monomer unit at a predetermined proportion, the copolymer latex having an insoluble content in methyl ethyl ketone of 70 wt % or less and a swelling degree in methyl ethyl ketone of 40 times or more when the copolymer contained in the latex is famed into a dry film, thereby accomplishing the present invention.

Specifically, according to the present invention, a copolymer latex of a copolymer comprising 50 to 88 wt % of a conjugated diene monomer unit, 10 to 40 wt % of an ethylenically unsaturated nitrile monomer unit, and 2 to 10 wt % of an ethylenically unsaturated acid monomer unit, the copolymer latex having an insoluble content in methyl ethyl ketone of 70 wt % or less and a swelling degree in methyl ethyl ketone of 40 times or more when the copolymer is famed into a dry film, is provided.

In the copolymer latex of the present invention, the ethylenically unsaturated acid monomer unit is preferably an ethylenically unsaturated monocarboxylic acid unit.

According to the present invention, a latex composition containing the aforementioned copolymer latex and a crosslinking agent is provided.

The latex composition of the present invention preferably further comprises a crosslinking accelerator.

Further, according to the present invention, a laminate obtained by forming a layer famed of the aforementioned latex composition on a fiber substrate, is provided.

Further, according to the present invention, a method for producing a laminate, comprising a step of dip-molding the aforementioned latex composition on a fiber substrate is provided.

In the method for producing a laminate of the present invention, the layer famed of the latex composition is famed on the fiber substrate preferably by depositing a divalent metal salt as a coagulant on the fiber substrate and immersing the fiber substrate with the divalent metal salt deposited in the latex composition.

Effects of Invention

According to the present invention, a copolymer latex capable of effectively suppressing the occurrence of cracks in a rubber layer famed thereof in a laminate including a fiber substrate and the rubber layer famed thereon, and a laminate including a rubber layer famed of the copolymer latex and a fiber substrate in which laminate the occurrence of cracks in the rubber layer is suppressed are provided.

DESCRIPTION OF EMBODIMENTS

Copolymer Latex

The copolymer latex of the present invention is a latex of a copolymer containing 50 to 88 wt % of a conjugated diene monomer unit, 10 to 40 wt % of an ethylenically unsaturated nitrile monomer unit, and 2 to 10 wt % of an ethylenically unsaturated acid monomer unit, the copolymer latex having an insoluble content in methyl ethyl ketone of 70 wt % or less and a swelling degree in methyl ethyl ketone of 40 times or more when the copolymer is famed into a dry film.

The copolymer latex of the present invention is a latex of a copolymer that is generally obtained by copolymerizing a conjugated diene monomer, an ethylenically unsaturated nitrile monomer, and an ethylenically unsaturated acid monomer, and other ethylenically unsaturated monomers that are copolymerizable with any of the aforementioned monomers, as required.

Examples of the conjugated diene monomer include 1,3-butadiene, isoprene, 2,3-dimethyl-1,3-butadiene, 2-ethyl-1,3-butadiene, 1,3-pentadiene, and chloroprene. Among these, 1,3-butadiene and isoprene are preferable, and 1,3-butadiene is more preferable. These conjugated diene monomers can be used individually, or two or more of them can be used in combination. The content of the conjugated diene monomer unit famed by the conjugated diene monomer in the copolymer contained in the copolymer latex is 50 to 88 wt %, preferably 55 to 80 wt %, more preferably 60 to 75 wt %.

When the content of the conjugated diene monomer unit is excessively small, the laminate to be obtained may possibly have poor texture, and conversely when it is excessively large, the laminate to be obtained may possibly have poor solvent resistance.

Examples of the ethylenically unsaturated nitrile monomer include acrylonitrile, methacrylonitrile, fumaronitrile, α-chloroacrylonitrile, and α-cyanoethyl acrylonitrile. Among these, acrylonitrile and methacrylonitrile are preferable, and acrylonitrile is more preferable. These ethylenically unsaturated nitrile monomers can be used individually, or two or more of them can be used in combination. The content of the ethylenically unsaturated nitrile monomer unit formed by the ethylenically unsaturated nitrile monomer in the copolymer contained in the copolymer latex is 10 to 40 wt %, preferably 15 to 40 wt %, more preferably 20 to 40 wt %. When the content of the ethylenically unsaturated nitrile monomer units is excessively small, the laminate to be obtained may possibly have poor solvent resistance. When it is excessively large, the laminate to be obtained may possibly have poor texture.

The ethylenically unsaturated acid monomer is not specifically limited as long as it is an ethylenically unsaturated monomer containing acidic groups such as carboxyl group, sulfonate group, phosphate group, and acid anhydride group, and examples thereof include an ethylenically unsaturated monocarboxylic acid monomer such as acrylic acid, methacrylic acid, and crotonic acid; ethylenically unsaturated polyvalent carboxylic acid monomers such as itaconic acid, maleic acid, and fumaric acid; an ethylenically unsaturated polyvalent carboxylic acid anhydride such as itaconic anhydride, maleic anhydride, and citraconic anhydride; an ethylenically unsaturated sulfonic acid monomer such as vinyl sulfonate, methyl vinyl sulfonate, styrene sulfonate, (meth)allyl sulfonic acid, ethyl (meth)acrylate-2-sulfonate, and 2-acrylamide-2-hydroxypropanesulfonic acid; an ethylenically unsaturated phosphoric acid monomer such as propyl (meth)acrylate-3-chloro-2-phosphate, ethyl (meth)acrylate-2-phosphate, and 3-allyloxy-2-hydroxypropanephosphoric acid; and an ethylenically unsaturated polyvalent carboxylic acid partial ester monomer such as methyl itaconate, methyl fumarate, monobutyl fumarate, methyl maleate, monobutyl maleate, and mono-2-hydroxypropyl maleate. Among these, an ethylenically unsaturated carboxylic acids is preferable, an ethylenically unsaturated monocarboxylic acids is more preferable, and a methacrylic acid is particularly preferable. These ethylenically unsaturated acid monomers can be used also in the form of an alkali metal salt or an ammonium salt. Further, the ethylenically unsaturated acid monomer can be used individually, or two or more of them can be used in combination.

The content of the ethylenically unsaturated acid monomer unit famed by the ethylenically unsaturated acid monomer in the copolymer contained in the copolymer latex is 2 to 10 wt %, preferably 3 to 9 wt %, more preferably 3 to 8 wt %. When the content of the ethylenically unsaturated acid monomer unit is excessively small, the formability when obtaining the laminate decreases. When it is excessively large, the laminate to be obtained may possibly have poor texture.

Examples of the other ethylenically unsaturated monomers that are copolymerizable with any of the conjugated diene monomer, the ethylenically unsaturated nitrile monomer, and the ethylenically unsaturated acid monomer include a vinyl aromatic monomer such as styrene, alkyl styrene, and vinyl naphthalene; a fluoroalkyl vinyl ether such as fluoroethyl vinyl ether; an ethylenically unsaturated amide monomer such as (meth)acrylamide, N-methylol (meth)acrylamide, N,N-dimethylol (meth)acrylamide, N-methoxymethyl (meth)acrylamide, and N-propoxymethyl (meth)acrylamide; an ethylenically unsaturated carboxylic acid ester monomer such as methyl (meth)acrylate, ethyl (meth)acrylate, buthyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate; and a crosslinkable monomer such as divinyl benzene, polyethylene glycol di(meth)acrylate, polypropylene glycol di(meth)acrylate, trimethylolpropane tri(meth)acrylate, and pentaerythritol (meth)acrylate. These ethylenically unsaturated monomers can be used individually, or two or more of them can be used in combination.

The content of the other monomer units formed by the other ethylenically unsaturated monomers in the copolymer contained in the copolymer latex is preferably 10 wt % or less, more preferably 5 wt % or less, further preferably 3 wt % or less.

Further, the copolymer latex of the present invention has an insoluble content in methyl ethyl ketone of 70 wt % or less and a swelling degree in methyl ethyl ketone of 40 times or more when the copolymer constituting the copolymer latex is famed into a dry film. According to the present invention, the copolymer constituting the copolymer latex has the aforementioned specific monomer composition and has an insoluble content in methyl ethyl ketone and a swelling degree in methyl ethyl ketone within the aforementioned ranges, thereby enabling the occurrence of cracks to be effectively suppressed in a rubber layer famed thereof in a laminate including a fiber substrate and the rubber layer famed thereon.

In particular, when obtaining a laminate by forming a rubber layer on a fiber substrate by dip molding using a copolymer latex, a coagulant is used for solidifying the copolymer latex. When a divalent metal salt such as calcium nitrate is used as the coagulant, there has been a problem that cracks occur, although the thickness of the rubber layer famed of the copolymer latex can be comparatively increased. Meanwhile, when a monovalent organic acid such as acetic acid is used as the coagulant, there has been a problem that the thickness of the rubber layer famed of the copolymer latex cannot be increased, and therefore waterproof properties, chemical resistance, and the like cannot be sufficiently imparted, although the occurrence of cracks can be suppressed to some extent.

In contrast, as a result of diligent studies on suppressing cracks in a rubber layer in such a laminate including a fiber substrate and the rubber layer famed of a copolymer latex, the inventors have focused on the state when forming the rubber layer using the copolymer latex on the fiber substrate, specifically, fusion of particles of the copolymer on the top surface of the layer and mutual diffusibility of molecular chains of the copolymer. As a result of further studies, the inventors have found that such fusion of the particles and the mutual diffusibility of the molecular chains can be improved in a well-balanced manner by adjusting the amount of gel (the amount of the part having a crosslinked structure) and the swelling ratio in the copolymer to specific ranges, so that the occurrence of cracks in the rubber layer famed of the copolymer latex can be appropriately prevented. In particular, according to the present invention, since the occurrence of cracks in the rubber layer famed of the copolymer latex can be appropriately prevented even in the case of using a divalent metal salt such as calcium nitrate as the coagulant and also increasing the thickness of the rubber layer comparatively, sufficient waterproof properties and chemical resistance can be imparted to the laminate to be obtained.

In the copolymer latex of the present invention, the insoluble content in methyl ethyl ketone is 70 wt % or less, preferably 50 wt % or less, more preferably 30 wt % or less when the copolymer constituting the copolymer latex is formed into a dry film. Further, the lower limit of the insoluble content in methyl ethyl ketone is not specifically limited but is generally 0.1 wt % or more. The insoluble content in methyl ethyl ketone is an index indicating the amount of gel in the copolymer contained in the copolymer latex, and when the insoluble content in methyl ethyl ketone is excessively large, the effect of suppressing cracks in the rubber layer formed of the copolymer latex in a laminate including a fiber substrate and the rubber layer famed thereon cannot be obtained.

Further, in the copolymer latex of the present invention, the swelling degree in methyl ethyl ketone is 40 times or more, preferably 50 times or more, more preferably 60 times or more when the copolymer constituting the copolymer latex is formed into a dry film. Further, the upper limit of the swelling degree in methyl ethyl ketone is not specifically limited but is generally 500 times or less. The swelling degree in methyl ethyl ketone is an index indicating the swellability in the copolymer contained in the copolymer latex, and when the swelling degree in methyl ethyl ketone is excessively low, the effect of suppressing cracks in the rubber layer famed of the copolymer latex in a laminate including a fiber substrate and the rubber layer famed thereon cannot be obtained.

In the present invention, examples of a method for measuring the insoluble content in methyl ethyl ketone and the swelling degree in methyl ethyl ketone can be as follows. First, the copolymer latex of the present invention is applied onto a substrate by casting method or the like, followed by drying, to obtain a dry film, and the weight of the dry film (this weight will be referred to as "W1") is measured. Subsequently, the obtained dry film is immersed in methyl ethyl ketone under conditions of 25° C. and 24 hours. Then, the weight of the film after the immersion (this weight will be referred to as "W2") is measured, and thereafter methyl ethyl ketone is removed by drying at 105° C. for 3 hours. Thereafter, the weight of the film after methyl ethyl ketone has been removed (this weight will be referred to as "W3") is measured, and the insoluble content in methyl ethyl ketone and the swelling degree in methyl ethyl ketone can be determined from the measurement results of these weights according to the following formulas (1) and (2).

Insoluble content in methyl ethyl ketone (unit: wt %)=(W3/W1)×100    (1)

Swelling degree in methyl ethyl ketone (unit: times) =W2/W3    (2)

Further, in the present invention, methods for adjusting the insoluble content in methyl ethyl ketone and the swelling degree in methyl ethyl ketone to the aforementioned ranges are not specifically limited, and examples thereof include selecting the type of or adjusting the amount of a chain transfer agent to be used for producing the copolymer constituting the copolymer latex, and adjusting the polymerization temperature.

The copolymer latex of the present invention is obtained by copolymerizing a monomer mixture containing the aforementioned monomers, and performing copolymerization by emulsion polymerization is preferable. As the emulsion polymerization method, conventionally known methods can be employed.

Polymerization auxiliary materials that are generally used such as an emulsifier, a polymerization initiator, and a chain transfer agent can be used for emulsion polymerization of the monomer mixture containing the aforementioned monomers. The method for adding these polymerization auxiliary materials is not specifically limited, and any one of methods such as initial one-time addition, split addition, and continuous addition may be employed.

The emulsifier is not specifically limited, and examples thereof can include a nonionic emulsifier such as polyoxyethylene alkyl ether, polyoxyethylene alkyl phenol ether, polyoxyethylene alkyl ester, and polyoxyethylene sorbitan alkyl ester; an anionic emulsifier such as alkyl benzene sulfonate, e.g., potassium dodecylbenzene sulfonate and sodium dodecylbenzene sulfonate, higher alcohol sulfate ester salts, and alkyl sulfosuccinate; a cationic emulsifier such as alkyl trimethyl ammonium chloride, dialkyl ammonium chloride, and benzyl ammonium chloride; and a copolymerizable emulsifier such as sulfoester of $\alpha,\beta$-unsaturated carboxylic acids, sulfate esters of $\alpha,\beta$-unsaturated carboxylic acids, and sulfoalkylaryl ethers. Among these, an anionic emulsifier is preferable, alkyl benzene sulfonate is more preferable, and potassium dodecylbenzene sulfonate and sodium dodecylbenzene sulfonate are particularly preferable. These emulsifiers can be used individually, or two or more of them can be used in combination. The amount of the emulsifier to be used is preferably 0.1 to 10 parts by weight with respect to 100 parts by weight of the monomer mixture.

The polymerization initiators are not specifically limited, and examples thereof can include an inorganic peroxide such as sodium persulfate, potassium persulfate, ammonium persulfate, potassium superphosphate, and hydrogen peroxide; an organic peroxide such as diisopropyl benzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-$\alpha$-cumyl peroxide, acetyl peroxide, isobutyryl peroxide, and benzoyl peroxide; and an azo compound such as azobisisobutyronitrile, azobis-2,4-dimethylvaleronitrile, and methyl azobisisobutyrate. These polymerization initiators can be used individually, or two or more of them can be used in combination. The amount of the polymerization initiators to be used is preferably 0.01 to 10 parts by weight, more preferably 0.01 to 2 parts by weight, with respect to 100 parts by weight of the monomer mixture.

Further, the peroxide initiators can be used as redox polymerization initiators in combination with reductants. The reductants are not specifically limited, and examples thereof include a compound containing reduced metal ions such as ferrous sulfate and cuprous naphthenate; sulfonic acid compounds such as sodium methanesulfonate; and an amine compound such as dimethyl aniline. These reductants can be individually used, or two or more of them can be used in combination. The amount of the reductant to be used is preferably 3 to 1000 parts by weight, with respect to 100 parts by weight of the peroxides.

The chain transfer agents are not specifically limited, and examples thereof include an $\alpha$-methylstyrene dimer; a mercaptan such as t-dodecyl mercaptan, n-dodecyl mercaptan, and octyl mercaptan; a halogenated hydrocarbon such as carbon tetrachloride, methylene chloride, and methylene bromide; and a sulfur-containing compound such as tetraethylthiuram disulfide, dipentamethylenethiuram disulfide, and diisopropyl xanthogen disulfide. These can be used individually, or two or more of them can be used in combination. Among these, a mercaptan is preferable, and t-dodecyl mercaptan can be more preferably used. The amount of the chain transfer agents to be used varies depending on the types, but is preferably 0.4 to 1.5 parts by weight, more preferably 0.5 to 1.2 parts by weight, further preferably 0.6 to 1.0 parts by weight, with respect to 100 parts by weight of the monomer mixture since the insoluble content in methyl ethyl ketone and the swelling degree in methyl ethyl ketone can be appropriately controlled to the aforementioned ranges.

The amount of water to be used in the emulsion polymerization is preferably 80 to 600 parts by weight, particularly preferably 100 to 200 parts by weight, with respect to 100 parts by weight of all monomers to be used.

Examples of the method for adding the monomer include adding the monomer to be used into a reaction container at one time, continuously or intermittently adding as the polymerization proceeds, and adding a part of the monomers to allow reaction to a specific conversion and thereafter continuously or intermittently adding the remaining monomers for polymerization, and any one of these methods may be employed. In the case of adding the mixed monomers continuously or intermittently, the composition of the mixture may be constant or varied. Further, the monomers may be added into the reaction container after the various monomers to be used are mixed in advance or may be added separately into the reaction container.

Further, polymerization auxiliary materials such as chelating agents, dispersants, pH adjusters, oxygen scavengers, and particle size modifiers can be used, as required, and both the types and the amounts of them to be used are not specifically limited.

The polymerization temperature for the emulsion polymerization is not specifically limited, but is preferably 5 to 55° C., more preferably 10 to 50° C., further preferably 15 to 45° C. since the insoluble content in methyl ethyl ketone and the swelling degree in methyl ethyl ketone can be appropriately controlled to the aforementioned ranges. In the case of changing the polymerization temperature with the progress of the polymerization reaction, it is preferable to control the temperature to the aforementioned ranges in any case. The polymerization time is about 5 to 40 hours.

The monomer mixture is subjected to emulsion polymerization as described above, and at the time when a predetermined polymerization conversion is achieved, the polymerization reaction is stopped, for example, by cooling the polymerization system or adding a polymerization terminator. The polymerization conversion at which the polymerization reaction is stopped is preferably 90 wt % or more, more preferably 93 wt % or more.

The polymerization terminator is not specifically limited, and examples thereof include hydroxyl amine, hydroxyamine sulfate, diethyl hydroxyl amine, hydroxyaminesulfonic acid, and alkali metal salts thereof, sodium dimethyl dithiocarbamate, hydroquinone derivatives, catechol derivatives, and aromatic hydroxydithiocarboxylic acids such as hydroxydimethylbenzenethiocarboxylic acid, hydroxydiethylbenzenedithiocarboxylic acid, and hydroxydibutylbenzenedithiocarboxylic acid, and alkali metal salts thereof. The amount of the polymerization terminator to be used is preferably 0.05 to 2 parts by weight, with respect to 100 parts by weight of the monomer mixture.

After the polymerization reaction is stopped, unreacted monomers may be removed and the solid content or the pH may be adjusted, if desired, and thus a latex of the copolymer can be obtained.

Further, anti-aging agents, preservatives, antibacterial agents, dispersants, and the like may be appropriately added to the latex of the copolymer used in the present invention, as required.

The number average particle size of the copolymer contained in the copolymer latex used in the present invention is preferably 60 to 300 nm, more preferably 80 to 150 nm. The particle size can be adjusted to a desired value, for example, by adjusting the amount of the emulsifier and the polymerization initiator to be used.

Latex Composition

The latex composition of the present invention contains the aforementioned copolymer latex of the present invention and a crosslinking agent.

The crosslinking agent is not specifically limited, but an organic peroxide or a sulfur crosslinking agent can be used. Among these, a sulfur crosslinking agent is preferable.

Examples of the sulfur crosslinking agent include a sulfur such as powdered sulfur, sulfur flowers, precipitated sulfur, colloid sulfur, surface-treated sulfur, and insoluble sulfur; sulfur-containing compounds such as sulfur chloride, sulfur dichloride, morpholine disulfide, alkyl phenol disulfide, dibenzothiazyl disulfide, caprolactam disulfide, phosphorus-containing polysulfide, and polymer polysulfide; and sulfur-donor compounds such as tetramethyl thiuram disulfide, selenium dimethyldithiocarbamate, and 2-(4'-morpholinodithio)benzothiazole. One of these may be used alone, or a plurality of types of them may be used in combination.

The amount of the crosslinking agent to be used in the latex composition of the present invention is preferably 0.01 to 5 parts by weight, more preferably 0.05 to 3 parts by weight, further preferably 0.1 to 2 parts by weight, with respect to 100 parts by weight of the copolymer contained in the copolymer latex. By adjusting the amount of the crosslinking agent to be used to the aforementioned ranges, the laminate to be obtained can be more excellent in texture and solvent resistance.

Further, in the case of using a sulfur as the crosslinking agent, a crosslinking accelerator (vulcanization accelerator) or zinc oxide is preferably mixed.

The crosslinking accelerator (vulcanization accelerator) is not specifically limited, and examples thereof include a dithiocarbamic acid such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, diethylthiocarbaylthio)benzothiazole, 2-(2,6-dimethyl-4-morpholinothio)benzothiazole, 2-(4'-morpholinodithio)benzothiazole, 4-morpholinyl-2-benzothiazyl disulfide, and 1,3-bis(2-benzothiazylmercaptomethyl) urea. Among these, zinc diethyldithiocarbamate, zinc dibutyldithiocarbamate, 2-mercaptobenzothiazole, and zinc 2-mercaptobenzothiazole are preferable. One of these crosslinking accelerators can be used alone, or two or more of them can be used in combination. The amount of the crosslinking accelerators to be used is preferably 0.1 to 10 parts by weight, more preferably 0.5 to 5 parts by weight, with respect to 100 parts by weight of the copolymer contained in the copolymer latex.

Further, the amount of the zinc oxide to be used is preferably 5 parts by weight or less, more preferably 0.1 to 3 parts by weight, further preferably 0.5 to 2 parts by weight, with respect to 100 parts by weight of the copolymer contained in the copolymer latex.

The latex composition of the present invention may contain a viscosity modifier for adjusting the viscosity to a desired range. Examples of the viscosity modifier include a carboxymethyl cellulose thickener, a polycarboxylic acid thickener, and a polysaccharide thickener. The viscosity of the latex composition of the present invention is preferably 500 to 8,000 mPa·s.

Further, various additives such as anti-aging agents, antioxidants, preservatives, antibacterial agents, humectants, dispersants, pigments, dyes, fillers, reinforcing materials, and pH adjusters can be added to the latex composition of the present invention in predetermined amounts, as required.

The solid content of the latex composition of the present invention is preferably 15 to 45 wt %, more preferably 25 to 45 wt %. Further, the surface tension of the latex composition of the present invention is preferably 25 to 40 mN/m.

Laminate

The laminate of the present invention is obtained by forming a rubber layer on a fiber substrate using the aforementioned latex composition of the present invention and includes the fiber substrate and the rubber layer famed of the latex composition of the present invention.

The method for forming the rubber layer on the fiber substrate using the aforementioned latex composition of the present invention is not specifically limited, but it is preferable to use dip molding method for the formation. Conventionally known methods can be employed for dip molding method, and examples thereof include direct dipping method, anode coagulant dipping method, and Teague coagulant dipping method. Among these, anode coagulant dipping method is preferable since the thickness of the rubber layer famed of the latex composition is easily made uniform. Hereinafter, dip molding method by anode coagulant dipping method will be described as one embodiment. First, a dip mold covered with the fiber substrate is immersed in a coagulant solution, to deposit the coagulant on the surface of the fiber substrate.

As the dip mold, various molds made of a material such as porcelain, glass, metal, and plastic can be used. The shape of the mold may correspond to the shape of the laminate that is the final product. For example, in the case where the laminate is a glove, various shapes such as a shape extending from the wrist to the fingertips and a shape extending from the elbow to the fingertips can be used as the shape of the dip mold. Further, the surface of the dip mold may be fully or partially subjected to surface finishing such as gloss finishing, semi-gloss finishing, non-gloss finishing, and woven patterning.

The coagulant solution is a solution obtained by dissolving a coagulant capable of solidifying latex particles in water, alcohol, or a mixture thereof. The coagulant is not specifically limited, but a divalent metal salt is preferably used since the thickness of the rubber layer famed of the latex composition can be comparatively increased. Examples of the divalent metal salt include a metal halide such as barium chloride, calcium chloride, magnesium chloride, and zinc chloride; nitrates such as barium nitrate, calcium nitrate, and zinc nitrate; acetates such as barium acetate, calcium acetate, and zinc acetate; and sulfates such as calcium sulfate and magnesium sulfate. Among these, calcium chloride and calcium nitrate are preferable, and calcium nitrate is more preferable.

The coagulant is generally used in the form of a solution of water, alcohol, or a mixture thereof. The coagulant concentration is generally 1 to 40 wt %, preferably 2.5 to 30 wt %.

Then, the dip mold having the fiber substrate with the coagulant deposited is immersed in the aforementioned latex composition of the present invention, and thereafter, the dip mold is pulled out to form a rubber layer as a dip-molded layer on the surface of the fiber substrate. Subsequently, the rubber layer as the dip-molded layer famed on the dip mold is heated, to crosslink the copolymer constituting the dip-molded layer.

The heating temperature for crosslinking is preferably 60 to 160° C., more preferably 80 to 150° C. When the heating temperature is excessively low, a long time is required for the crosslinking reaction, and therefore the productivity may possibly decrease. When the heating temperature is excessively high, the deterioration of the copolymer by oxidation is accelerated, and the physical properties of the laminate to be obtained may possibly decrease. The heating time may be appropriately selected corresponding to the heating temperature but is generally 5 to 120 minutes.

In the present invention, the latex composition of the present invention is preferably aged before being subjected to dip molding (such aging is also referred to as prevulcanization). The temperature condition for the aging is preferably 20 to 50° C. Further, the aging time is preferably 4 hours or more and 120 hours or less, more preferably 24 hours or more and 72 hours or less, in that separation between the fiber substrate and the rubber layer famed of the latex composition does not occur, and the permeation of solvent gases is suppressed. When the aging time is excessively short or excessively long, the copolymer forming the rubber layer in the laminate to be obtained does not penetrate sufficiently or penetrates too much into the fiber substrate.

In the present invention, before the rubber layer is heated, the rubber layer is preferably immersed in hot water at 20 to 80° C. for about 0.5 to 60 minutes, to remove water-soluble impurities (such as an emulsifier, a water-soluble polymer, and a coagulant).

Subsequently, a laminate can be obtained by separating the fiber substrate containing the rubber layer crosslinked by heating from the dip mold. Further, after the laminate is separated from the dip mold, heating at a temperature of 60 to 120° C. for 10 to 120 minutes (post-crosslinking step) may be further performed. Further, a surface-treated layer by chlorination or coating may be formed on the inner and/or outer surface of the laminate.

The thickness of the rubber layer in the laminate of the present invention is preferably 0.1 to 0.8 mm, more preferably 0.1 to 0.5 mm, further preferably 0.3 to 0.5 mm. According to the present invention, since the rubber layer is foiled of the latex composition obtained using the copolymer latex of the present invention, the occurrence of cracks in the rubber layer can be effectively suppressed, and particularly even in the case where the thickness of the rubber layer is comparatively increased as described above, the occurrence of cracks in the rubber layer can be effectively suppressed. As a result, the laminate to be obtained can be sufficiently excellent in waterproof properties and chemical resistance. Therefore, the laminate of the present invention can be suitably used for work gloves, particularly for domestic, agricultural, fishing, and industrial protective gloves. Since the rubber layer constituting the laminate of the present invention is famed on the fiber substrate, the shape of the rubber layer depends on the shape of the surface of the fiber substrate in the micro structure, but in the present invention, when focusing on each fiber constituting the surface of the fiber substrate, an average of the thickness of the rubber layer from the top surface of each fiber in viewing along the diameter direction thereof (that is, when focusing on one fiber constituting the surface of the fiber substrate, the thickness of the part where the rubber layer appears thinnest) is taken as the thickness of the rubber layer.

EXAMPLES

Hereinafter, the present invention will be described based on further detailed examples, but the present invention is not limited to these examples. In the following, "part(s)" is by weight, unless otherwise specified. Further, tests and evaluations were as follows.

Insoluble Content in Methyl Ethyl Ketone and Swelling Degree in Methyl Ethyl Ketone The copolymer latex produced in each of Examples and Comparative Examples was applied onto a substrate by casting method, followed by drying at 25° C. for 120 hours, to obtain a dry film, and the weight of the obtained dry film (this weight will be referred to as "W1") was measured. Next, after the obtained dry film was immersed in methyl ethyl ketone under conditions of 25° C. and 24 hours, the weight of the film after the immersion (this weight will be referred to as "W2") was measured, followed by drying at 105° C. for 3 hours, to remove methyl ethyl ketone. Then, the weight of the film after the removal of methyl ethyl ketone (this weight will be referred to as "W3") was measured, and the insoluble content in methyl ethyl ketone and the swelling degree in methyl ethyl ketone were determined using the measurement results of these weights according to the following formulas (1) and (2).

Insoluble content in methyl ethyl ketone (unit: wt %)=(W3/W1)×100　　　(1)

Swelling degree in methyl ethyl ketone (unit: times) =W2/W3　　　(2)

Thickness of Rubber Layer

The thickness of the rubber layer in the protective glove produced in each of Examples and Comparative Examples was measured using an optical microscope. Specifically, the cross section of the palm part of the fabricated protective glove which was located at 12 cm from the tip of the middle finger and where the rubber layer was laminated was observed as a measurement sample using an optical microscope (VHX-200, manufactured by KEYENCE CORPORATION), to determine the thickness of the rubber layer. In this measurement, focusing on each fiber constituting the surface of the textile glove serving as the fiber substrate, the thickness of the rubber layer from the top surface of each fiber in viewing along the diameter direction thereof (that is, focusing on each fiber constituting the surface of the textile glove, the thickness of the part where the rubber layer appeared thinnest) was measured on the cut surface within the range of the measurement field-of-view, and an average thereof was taken as the thickness of the rubber layer.

Presence or Absence of Cracks in Rubber Layer

The presence or absence of cracks in the rubber layer was determined by evaluating cracks in the part of the protective glove produced in each of Examples and Comparative Examples where the rubber layer was famed. Specifically, the cracks in the part where the rubber layer was famed were evaluated according to the evaluation criteria in "Size, depth, and ranking of cracks" defined in Table 1 (the state of cracks) of "Annex 1 (Provision) Method for evaluating cracks" of JIS K 6259. That is, the states of cracks on the surface of the protective glove produced in each of Examples and Comparative Examples were ranked according to the aforementioned criteria, where those ranked as "1 (no cracks were observed with naked eyes, but cracks were observed with a 10-times magnifying glass)" were determined as "Good (absence of cracks)", and those ranked as "2 (cracks were observed with naked eyes)" or higher were determined as "Poor (presence of cracks)". Further, those in which no cracks were observed with both naked eyes and a 10-times magnifying glass were determined as "Excellent (absence of cracks)".

Example 1

(Production of Latex of Copolymer (A1))

27 parts of acrylonitrile, 67.5 parts of 1,3-butadiene, 5.5 parts of methacrylic acid, 0.8 part of t-dodecyl mercaptan, 132 parts of ion exchange water, 3 parts of sodium dodecylbenzenesulfonate, 0.5 part of sodium salt of β-naphthalenesulfonic acid formalin condensate, 0.3 part of potassium persulfate, and 0.05 part of sodium ethylenediaminetetraacetate were put into a polymerization reactor, and the polymerization temperature was maintained at 37° C., to start polymerization. Subsequently, at the time when the polymerization conversion reached 70%, the polymerization temperature was raised to 45° C., and the reaction was allowed to proceed continuously to a polymerization conversion of 93%. Thereafter, 0.1 part of sodium dimethyl dithiocarbamate as a polymerization terminator was added thereto to stop the polymerization reaction. Then, unreacted monomers were distilled off from the obtained copolymer latex under reduced pressure, and thereafter, the solid content and the pH were adjusted, to obtain a latex of copolymer (A1) with a solid content of 45 wt % and a pH of 8.5. The composition of copolymer (A1) contained in the obtained latex included 27 wt % of an acrylonitrile unit, 68 wt % of a 1,3-butadiene unit, and 5 wt % a methacrylic acid unit. Further, as measured according to the aforementioned methods, the latex of copolymer (A1) had an insoluble content in methyl ethyl ketone of 5 wt % or less and a swelling degree in methyl ethyl ketone of 100 times.

(Preparation of Latex Composition)

Then, 1 part of an aqueous dispersion of colloid sulfur (manufactured by Hosoi Chemical Industry Co., Ltd.) in tams of colloid sulfur, 0.5 part of an aqueous dispersion of zinc dibutyldithiocarbamate (manufactured by Ouchi Shinko Chemical Industrial Co., Ltd.) in terms of zinc dibutyldithiocarbamate, and 2 parts of zinc oxide (manufactured by Seido Chemical Industry Co., Ltd.) in terms of zinc oxide were added to the latex of copolymer (A1) obtained above (100 parts in terms of copolymer (A1)). When adding them, the aqueous dispersion of each compounding agent was gradually added in a predetermined amount under stirring the latex. Then, after the additives were uniformly mixed, ARON (manufactured by Toagosei Co., Ltd.) was added as a viscosity modifier, to adjust the viscosity to 4,000 mPa·s, thereby obtaining a latex composition.

Further, before being subjected to dip molding, the obtained latex composition was aged (which is also referred to as prevulcanization) for use. The temperature condition for aging was 30° C. Further, the aging time was 48 hours.

(Production of Laminate (Protective Glove))

Using the latex composition obtained above, a laminate (protective glove) was produced by the following method.

Specifically, a ceramic glove mold covered with a textile glove was first immersed in a coagulant solution composed of a 2.5-wt % calcium nitrate solution in methanol for 10 seconds, followed by drying under conditions of 30° C. and 1 minute after being pulled out, to deposit the coagulant on the textile glove. Thereafter, a glove mold covered with the textile glove with the coagulant deposited was immersed in the latex composition obtained above for 20 seconds, followed by drying at 30° C. for 10 minutes after being pulled out and then drying at 70° C. for 10 minutes. Thereafter, it was immersed in hot water at 60° C. for 90 seconds to elute water-soluble impurities, followed by drying again at 30° C. for 10 minutes. Heating was further performed at 125° C. for 30 minutes, thereby crosslinking the dip-molded layer. Subsequently, the crosslinked laminate was separated from the glove mold, to obtain a protective glove in which a rubber layer was famed on the textile glove. Then, the thickness of the rubber layer and the presence or absence of cracks in the obtained protective glove were examined. Table 1 shows the results.

Example 2

(Production of Latex of Copolymer (A2))

A latex of copolymer (A2) with a solid content of 45 wt % and a pH of 8.5 was obtained in the same manner as in Example 1 except that the amount of t-dodecyl mercaptan used was changed from 0.8 part to 0.7 part, and the polymerization reaction was allowed to proceed to a polymerization conversion of 96%. The composition of copolymer (A2) contained in the obtained latex included 27 wt % of an acrylonitrile unit, 68 wt % of a 1,3-butadiene unit, and 5 wt % of a methacrylic acid unit. Further, as measured according to the aforementioned methods, the latex of copolymer (A2) had an insoluble content in methyl ethyl ketone of 50 wt % and a swelling degree in methyl ethyl ketone of 70 times.

(Preparation of Latex Composition and Production of Laminate (Protective Glove))

Further, a latex composition was prepared and a protective glove was obtained using the prepared latex composition in the same manner as in Example 1 except that the latex of copolymer (A2) obtained above was used instead of the latex of copolymer (A1). Then, the obtained protective glove was evaluated in the same manner as in Example 1. Table 1 shows the results.

Example 3

(Production of Latex of Copolymer (A3))

A latex of copolymer (A3) with a solid content of 45 wt % and a pH of 8.5 was obtained in the same manner as in Example 1 except that the amount of t-dodecyl mercaptan used was changed from 0.8 part to 0.6 part, and that the polymerization reaction was allowed to proceed to a polymerization conversion of 96%. The composition of copolymer (A3) contained in the obtained latex included 27 wt % of an acrylonitrile unit, 68 wt % of a 1,3-butadiene unit, and 5 wt % of a methacrylic acid unit. Further, as measured according to the aforementioned methods, the latex of copolymer (A3) had an insoluble content in methyl ethyl ketone of 60 wt % and a swelling degree in methyl ethyl ketone of 60 times.

(Preparation of Latex Composition and Production of Laminate (Protective Glove))

Further, a latex composition was prepared and a protective glove was obtained using the prepared latex composition in the same manner as in Example 1 except that the latex of copolymer (A3) obtained above was used instead of the latex of copolymer (A1). Then, the obtained protective glove was evaluated in the same manner as in Example 1. Table 1 shows the results.

Example 4

(Production of Latex of Copolymer (A4))

A latex of copolymer (A4) with a solid content of 45 wt % and a pH of 8.5 was obtained in the same manner as in Example 1 except the following: the amount of acrylonitrile used was changed from 27 parts to 22 parts, the amount of 1,3-butadiene used was changed from 67.5 parts to 74.5 parts, the amount of methacrylic acid used was changed from 5.5 parts to 3.5 parts, and the amount of t-dodecyl mercaptan used was changed from 0.8 part to 0.6 part. The composition of copolymer (A4) contained in the obtained latex included 22 wt % of an acrylonitrile unit, 75 wt % of a 1,3-butadiene unit, and 3 wt % of a methacrylic acid unit. Further, as measured according to the aforementioned methods, the latex of copolymer (A4) had an insoluble content in methyl ethyl ketone of 5 wt % or less and a swelling degree in methyl ethyl ketone of 130 times.

(Preparation of Latex Composition and Production of Laminate (Protective Glove))

Further, a latex composition was prepared and a protective glove was obtained using the prepared latex composition in the same manner as in Example 1 except that the latex of copolymer (A4) obtained above was used instead of the latex of copolymer (A1). Then, the obtained protective glove was evaluated in the same manner as in Example 1. Table 1 shows the results.

Comparative Example 1

(Production of Latex of Copolymer (A5))

A latex of copolymer (A5) with a solid content of 45 wt % and a pH of 8.5 was obtained in the same manner as in Example 1 except that the amount of t-dodecyl mercaptan used was changed from 0.8 part to 0.3 part, and that the polymerization reaction was allowed to proceed to a polymerization conversion of 96%. The composition of copolymer (A5) contained in the obtained latex included 27 wt % of an acrylonitrile unit, 68 wt % of a 1,3-butadiene unit, and 5 wt % of a methacrylic acid unit. Further, as measured according to the aforementioned methods, the latex of copolymer (A5) had an insoluble content in methyl ethyl ketone of 77 wt % and a swelling degree in methyl ethyl ketone of 36 times.

(Preparation of Latex Composition and Production of Laminate (Protective Glove))

Further, a latex composition was prepared and a protective glove was obtained using the prepared latex composition in the same manner as in Example 1 except that the latex of copolymer (A5) obtained above was used instead of the latex of copolymer (A1). Then, the obtained protective glove was evaluated in the same manner as in Example 1. Table 1 shows the results.

Comparative Example 2

(Production of Latex of Copolymer (A6))

A latex of copolymer (A6) with a solid content of 45 wt % and a pH of 8.5 was obtained in the same manner as in Example 3 except that the holding temperature at the start of the polymerization was changed from 37° C. to 60° C., and that the polymerization temperature at the time when the polymerization conversion reached 70% was changed from 45° C. to 80° C. The composition of copolymer (A6)

contained in the obtained latex included 27 wt % of an acrylonitrile unit, 68 wt % of a 1,3-butadiene unit, and 5 wt % of a methacrylic acid unit. Further, as measured according to the aforementioned methods, the latex of copolymer (A6) had an insoluble content in methyl ethyl ketone of 79 wt % and a swelling degree in methyl ethyl ketone of 27 times.

(Preparation of Latex Composition and Production of Laminate (Protective Glove))

Further, a latex composition was prepared and a protective glove was obtained using the prepared latex composition in the same manner as in Example 1 except that the latex of copolymer (A6) obtained above was used instead of the latex of copolymer (A1). Then, the obtained protective glove was evaluated in the same manner as in Example 1. Table 1 shows the results.

Comparative Example 3

(Production of Latex of Copolymer (A7))

A latex of copolymer (A7) with a solid content of 45 wt % and a pH of 8.5 was obtained in the same manner as in Example 1 except the following: the amount of acrylonitrile used was changed from 27 parts to 32.5 parts, the amount of 1,3-butadiene used was changed from 67.5 parts to 59 parts, and the amount of methacrylic acid used was changed from 5.5 parts to 8.5 parts, the holding temperature at the start of the polymerization was changed from 37° C. to 40° C., the polymerization temperature at the time when the polymerization conversion reached 70% was changed from 45° C. to 60° C., and the polymerization reaction was allowed to proceed to a polymerization conversion of 96%. The composition of copolymer (A7) contained in the obtained latex included 32 wt % of an acrylonitrile unit, 60 wt % of a 1,3-butadiene unit, and 8 wt % of a methacrylic acid unit. Further, as measured according to the aforementioned methods, the latex of copolymer (A7) had an insoluble content in methyl ethyl ketone of 53 wt % and a swelling degree in methyl ethyl ketone of 33 times.

(Preparation of Latex Composition and Production of Laminate (Protective Glove))

Further, a latex composition was prepared and a protective glove was obtained using the prepared latex composition in the same manner as in Example 1 except that the latex of copolymer (A7) obtained above was used instead of the latex of copolymer (A1). Then, the obtained protective glove was evaluated in the same manner as in Example 1. Table 1 shows the results.
[Table 1]

In Table 1, the amount of the chain transfer agents to be used is the amount with respect to a total of 100 parts of monomers used for polymerization.

As shown in Table 1, in the case of using a copolymer latex that is a latex of a copolymer containing a conjugated diene monomer unit, an ethylenically unsaturated nitrile monomer unit, and an ethylenically unsaturated acid monomer unit at a predetermined proportion, the copolymer latex having an insoluble content in methyl ethyl ketone of 70 wt % or less and a swelling degree in methyl ethyl ketone of 40 times or more, the occurrence of cracks was effectively suppressed in the rubber layer constituting the laminate (protective glove) even when the thickness was as comparatively large as 0.3 mm or more, and various properties obtained by forming the rubber layer such as waterproof properties and chemical resistance were sufficient (Examples 1 to 4).

On the other hand, in the case of using those having an insoluble content in methyl ethyl ketone of over 70 wt % and a swelling degree in methyl ethyl ketone of less than 40 times, cracks occurred in the rubber layer constituting the laminate (protective glove), and the properties obtained by forming the rubber layer such as waterproof properties and chemical resistance were not sufficiently obtained (Comparative Examples 1 and 2).

Further, also in the case of using those having an insoluble content in methyl ethyl ketone of 70 wt % or less but a swelling degree in methyl ethyl ketone of less than 40 times, cracks occurred in the rubber layer constituting the laminate (protective glove), and the properties obtained by forming the rubber layer such as waterproof properties and chemical resistance were not sufficiently obtained (Comparative Example 3).

The invention claimed is:

1. A method for producing a laminate, comprising a step of dip-molding a latex composition on a fiber substrate, the method comprising:
copolymerizing a monomer mixture by emulsion polymerization using a chain transfer agent in an amount of 0.5 to 1.2 parts by weight with respect to 100 parts by weight of the monomer mixture to obtain a copolymer latex,
mixing the copolymer latex and a crosslinking agent to obtain the latex composition,
immersing a dip mold covered with the fiber substrate in a coagulant solution to deposit a coagulant on a surface of the fiber substrate, and

TABLE 1

|  |  | Example | | | | Comparative Example | | |
| --- | --- | --- | --- | --- | --- | --- | --- | --- |
|  |  | 1 | 2 | 3 | 4 | 1 | 2 | 3 |
| Latex of copolymer | | | | | | | | |
| Composition | Amount of acrylonitrile unit (wt %) | 27 | 27 | 27 | 22 | 27 | 27 | 32 |
|  | Amount of 1,3-butadiene unit (wt %) | 68 | 68 | 68 | 75 | 68 | 68 | 60 |
|  | Amount of methacrylic acid unit (wt %) | 5 | 5 | 5 | 3 | 5 | 5 | 8 |
|  | Polymerization temperature (° C.) | 37~45 | 37~45 | 37~45 | 37~45 | 37~45 | 60~80 | 40~60 |
|  | Polymerization conversion (wt %) | 93 | 96 | 96 | 93 | 96 | 96 | 96 |
|  | Amount of chain transfer agent used (part(s)) | 0.8 | 0.7 | 0.6 | 0.6 | 0.3 | 0.6 | 0.8 |
|  | Insoluble content in methyl ethyl ketone (wt %) | 5 or less | 50 | 60 | 5 or less | 77 | 79 | 53 |
|  | Swelling degree in methyl ethyl ketone | 100 times | 70 times | 60 times | 130 times | 36 times | 27 times | 33 times |
| Laminate | | | | | | | | |
|  | Thickness of rubber layer (mm) | 0.32 | 0.34 | 0.32 | 0.30 | 0.33 | 0.32 | 0.31 |
|  | Presence or absence of cracks | Excellent | Good | Good | Excellent | Poor | Poor | Poor | immersing the fiber substrate with the coagulant deposited in the latex composition to form a layer formed of the latex composition on the fiber substrate;

wherein the copolymer latex is a latex of a copolymer comprising 68 to 75 wt % of 1,3-butadiene unit, 22 to 27 wt % of acrylonitrile unit, and 3 to 5 wt % of methacrylic acid unit, the copolymer latex has an insoluble content in methyl ethyl ketone of 70 wt % or less and a swelling degree in methyl ethyl ketone of 40 times or more when the copolymer is formed into a dry film, and the coagulant concentration of the coagulant solution is 2.5 to 30 wt %.

2. The method for producing a laminate according to claim 1, wherein a divalent metal salt as the coagulant is deposited on the fiber substrate, and the fiber substrate with the divalent metal salt deposited is immersed in the latex composition to form the layer formed of the latex composition on the fiber substrate.

3. The method for producing a laminate according to claim 1, wherein the latex composition further comprises a crosslinking accelerator.

4. The method for producing a laminate according to claim 1, wherein the latex composition further comprises a viscosity modifier.

5. The method for producing a laminate according to claim 1, wherein the viscosity of the latex composition is 500 to 8,000 mPa·s.

6. The method for producing a laminate according to claim 1, wherein the thickness of the layer formed of the latex composition is 0.3 to 0.8 mm.

* * * * *